United States Patent [19]

Gilbert et al.

[11] Patent Number: 5,041,848
[45] Date of Patent: Aug. 20, 1991

[54] NON-GARY SCALE ANTI-ALIASING METHOD FOR LASER PRINTERS

[76] Inventors: John M. Gilbert, 604 2nd St., NE., Minneapolis, Minn. 55413; Lawrence J. Lukis, 6366 150th St.; Leonard R. Steidel, 3473 Willow Beach Trail SW., both of Prior Lake, Minn. 55372

[21] Appl. No.: 434,318

[22] Filed: Nov. 13, 1989

[51] Int. Cl.$^5$ .............................................. H04N 1/21
[52] U.S. Cl. ...................... 346/108; 346/1.1; 358/296
[58] Field of Search ............... 346/108, 107 R, 76 L, 346/160, 1.1; 358/296, 300, 302, 298; 355/202

[56] References Cited

U.S. PATENT DOCUMENTS 4,180,854 12/1979 Walden et al. ...................... 364/200
4,682,189 7/1987 Purdy et al. ........................ 364/900

Primary Examiner—Mark J. Reinhart

[57] ABSTRACT

A non-gray scale anti-aliasing method for smoothing the horizontal components of the edges of an image to be printed by a laser printer having unequal pixel resolutions in the horizontal and vertical dimensions is accomplished by selectively modifying the on and off states of pixels on either side of each vertical transition point along the horizontal components of raster lines representing the edges of the pixel representation of the image. A processor is provided with an ideal outline of the image and rasterizes the ideal outline of the image to determine which pixels to turn on and which pixels to turn off in a frame buffer that stores a pixel representation of the iamge to be printed by the laser printer. The modified pixel representation in the frame buffer is then communicated to the laser printer such that the laser printer may print the smoothed image.

11 Claims, 5 Drawing Sheets

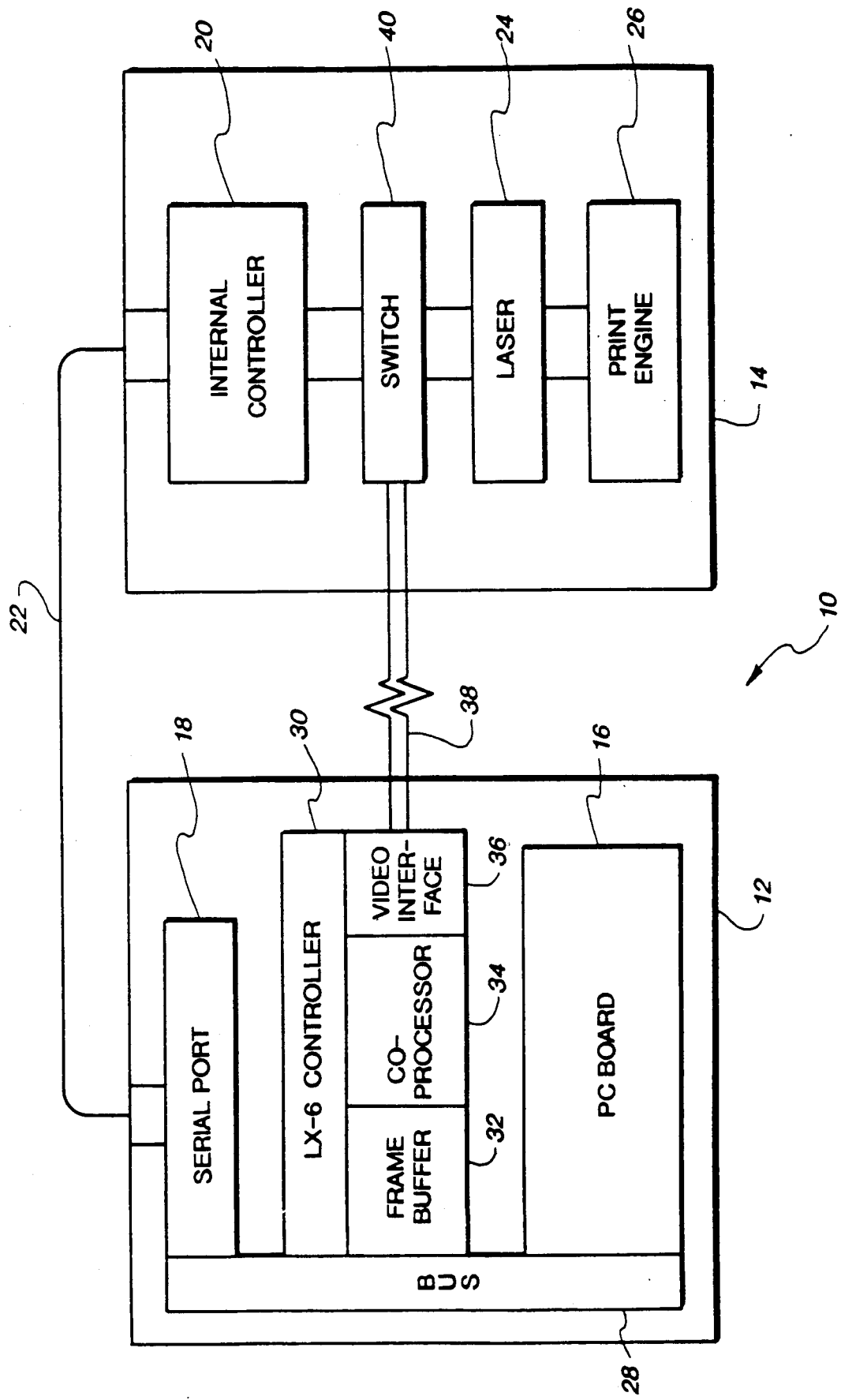

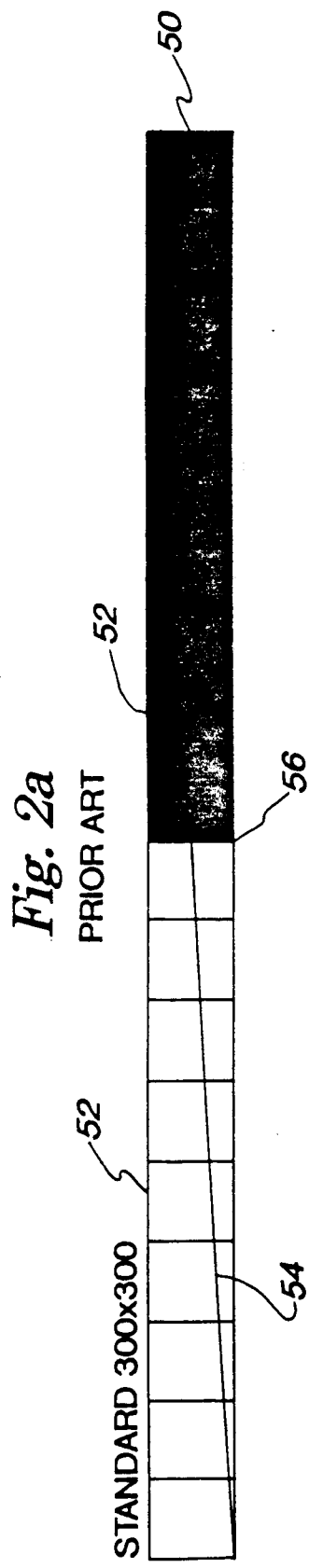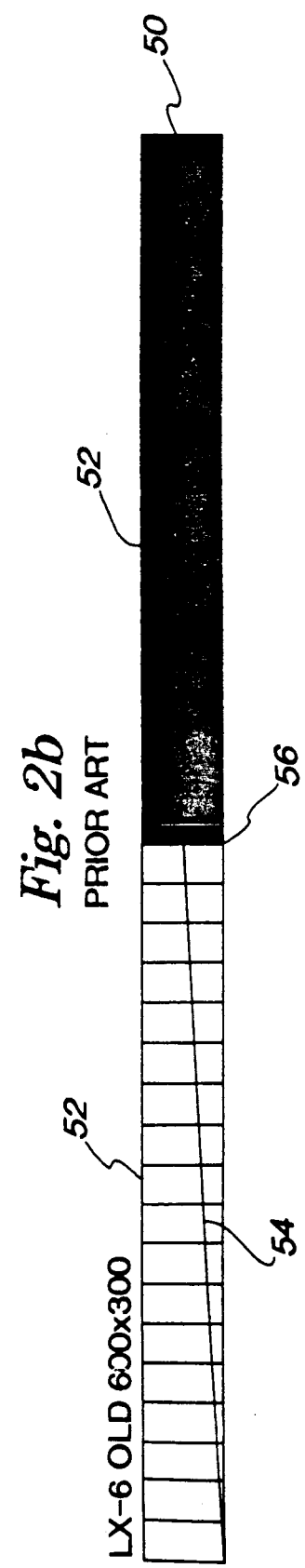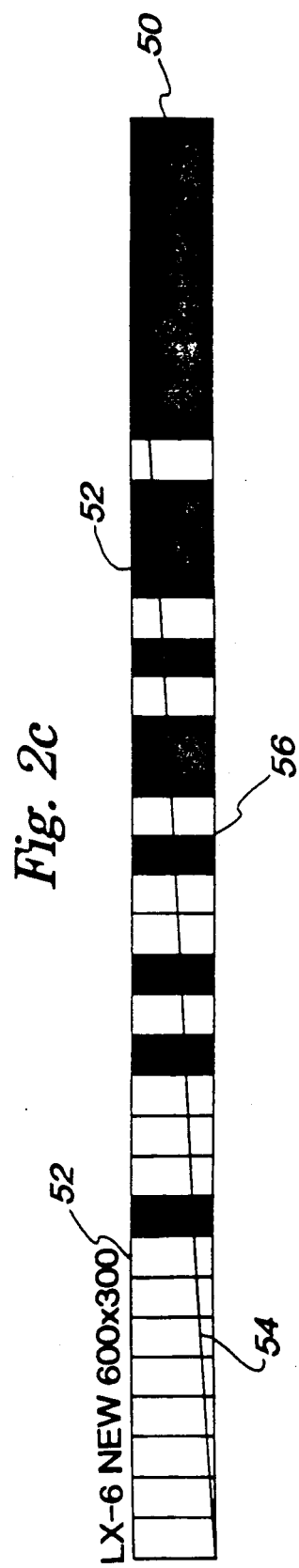

PRIOR ART (4x)

NON-GARY SCALE ANTI-ALIASING METHOD FOR LASER PRINTERS

TECHNICAL FIELD

This invention pertains to methods of rasterization and fill techniques used to create images to be printed by laser printers. More particularly, this invention pertains to a non-gray scale anti-aliasing method for smoothing the horizontal edges of an image to be printed by a laser printer having unequal resolutions in the horizontal and vertical dimensions.

BACKGROUND ART

In recent years, the use of smaller, inexpensive laser printers with personal computers has created an entirely new industry referred to as desktop publishing. Desktop publishing systems offer user the ability to format and print documents having complicated layouts using characters that have a variety of different fonts and type sizes. While desktop publishing systems represent a significant advance in the art of publishing, the standard resolution of the laser printers used with such systems (typically a 300×300 dpi Canon CX or SX-based laser printer, e.g. a HP LaserJet Series II printer) was too poor to compete with traditional phototypesetting systems.

In an effort to improve the quality and speed of the smaller, inexpensive laser printers used with desktop publishing systems, a variety of printer controller cards have been introduced that may be installed either in the laser printer or in the personal computer. Certain of the printer controller cards that are installed directly in the personal computer increase the quality and speed of the laser printers by using a separate co-processor and page frame buffer to create a pixel representation of the image to be printed on the laser printer. This image is then printed from the pixel representation in the page frame buffer by directly controlling the modulation of the laser in the print-engine of the laser printer. An example of such a printer control card is the LX6 Professional printer controller cards available from LaserMaster Corporation, Eden Prairie, Minn., the assignee of the present invention.

In some of the prior art printer controller cards, such as the LX6 Professional, it is possible to increase the horizontal resolution of the laser printer by controlling the modulation of the laser in the print-engine of the laser printer. By doing so, the LX6 Professional printer controller cards can increase the horizontal component of the pixel resolution of the laser printer to 600×300 dpi and 1000×400 dpi, depending upon the type of laser printer. This increase in horizontal resolution significantly improves the quality of the resulting printed image, particularly for pixel transition points along the outline edges of a character or image that occur in the vertical or near vertical orientation. Unfortunately, the increased horizontal resolution does little to improve the quality of the outline edges of a character or image that are near horizontal in slope.

The noticeability and appearance of such vertical pixel transition points is typically referred to as aliasing that results in jagged or stairstep edges of the character or image outline oriented generally in the horizontal direction. Traditionally, anti-aliasing techniques incorporating a gray-scale approach have been used in video displays to resolve this type of problem. Unfortunately, laser printers are binary imaging devices and are not capable of implementing such gray-scale techniques. In larger and more expensive laser printers, the problems associated with aliasing and non-smooth edges may be resolved by using higher pixel resolutions in these printers. In the smaller, inexpensive laser printers used with desktop publishing systems, this approach is not used because of the associated increase in cost.

While the prior art printer controller cards have allowed users of desktop publishing systems to significantly increase the quality of their printed outputs by increasing the horizontal resolution of the existing laser printers used with such systems, it would be advantageous to be able to improve the quality of the outline edges of a character or image that occur in a near horizontal orientation, particularly if such an improvement could be accomplished without any additional hardware that would increase the cost of such printer controller cards.

SUMMARY OF THE INVENTION

In accordance with the present invention, a non-gray scale anti-aliasing method for smoothing the horizontal components of the edges of an image to be printed by a laser printer having unequal pixel resolutions in the horizontal and vertical dimensions is accomplished by selectively modifying the on and off states of pixels on either side of each vertical transition point along the horizontal components of raster lines representing the edges of the pixel representation of the image. The method of the present invention may be used by a processor means that is provided with an ideal outline of the image and rasterizes the ideal outline of the image using the processor means to determine which pixels to turn on and which pixels to turn off in a frame buffer memory means that stores a pixel representation of the image to be printed by the laser printer. The method of the present invention produces a modified pixel representation in the frame buffer means that is communicated to the laser printer such that the laser printer may print the smoothed image.

In essence, the present invention smooths each of the vertical transition points between horizontal raster lines by adding and subtracting pixels around this transition point. The pixel representation created in the frame buffer for each horizontal raster line is used to control the laser i the laser printer. When the laser is turned on in response to an "on" pixel, a generally circular laser beam image is reflected on the print drum of the print engine to transfer charge elements to the drum. The charge elements attract and pick up the toner that is then transferred to the sheet of paper. Although the pixel elements are thought of as square or rectangular shapes, in actuality, the edges of the pixels typically bleed into one another to a significant degree.

This is due to the laser power function at the surface of the drum which typically decreases with the distance from the center of the focal point over a generally circular or elliptical area covering a space larger than the theoretical rectangular pixel. Therefore the total laser energy impinging upon a given point on the drum may have components contributed by more than a single sweep of the laser beam. This effect will be especially pronounced in the region between the centerlines of two adjacent raster lines. The total laser power impinging on a given point determines the resulting amount of charge on the drum at that point which in turn determines whether toner will stick to that point or not.

It is believed that the present invention takes advantage of the physics of this process at the higher laser modulation rate generated by the printer controller cards to create the desired smoothing of the transition points. For edges in the near horizontal raster line just below the outline edge, some of those charge elements overlap onto the next horizontal raster line that contains the outline edge with the transition point. In that next horizontal line, the application of the laser in response to the modified pixel representation briefly turns the laser on, for example, for a selectively modified "on" pixel prior to the transition point. The duration of this pulse of laser energy is insufficient to charge this pixel location enough to attract toner, however in the overlap region, sufficient charge may be added to the charge already deposited by the lower raster linen to alter the boundary of the region in which toner sticks to the drum. Thus, in effect the location of a horizontal edge of the image may be controlled to within less than the width of a full pixel.

The most significant advantage of using the smoothing method of the present invention in conjunction with a laser printer having unequal resolutions in the horizontal and vertical dimensions is that quality of the printed image is nearly equivalent to that of an image printed on a much higher resolution printer having equal resolutions in the horizontal and vertical dimension. Although the resolution of the laser printer is 600×300 dpi, the image produced using the method of the present invention will more closely resemble 600×600 dpi print quality. An additional advantage is that this increase in quality is accomplished using the modified pixel representation in a frame buffer memory that occupies half of the space of the frame buffer memory required to produce an equivalent pixel representation for a higher resolution printer. As a result less memory is needed for the printer controller card and the printer controller card is less expensive.

In the preferred embodiment of the present invention, the smoothing of the horizontal components of the edges of the ideal outline is accomplished during the fill process as each horizontal raster line is being rasterized. Typically, the horizontal raster lines are processed from top to bottom in the frame buffer and the pixels are processed from left to right. As each horizontal scan line of an ideal polygon outline is being rasterized, the processor accumulates a fill value that represents the area of each pixel inside of the ideal outline that should be turned "on" or filled. If the processor determines that the area of the fill value is greater than the area of a pixel, the pixel presently being processed is turned "on" and the area of a pixel is subtracted from the fill value. In this embodiment, the fill value acts like a running accumulator with the carry out of the accumulator being used to determine whether the pixel presently being processed should be turned "on". Any number of methods can be used to determine the amount of the fill value for each pixel. For example, instead of calculating the entire area inside the ideal outline, the height of the midpoint of the segment of the ideal outline in the pixel or the height of the intersection of the ideal outline with the right or left edge of the pixel could be used to estimate the value of the area inside the ideal outline. A similar method may be used to process edges and transitions which occur in the near vertical direction.

A primary objective of the present invention is to provide a non-gray scale anti-aliasing method for smoothing the horizontal edges of an image to be printed by a laser printer having unequal resolutions in the horizontal and vertical dimensions.

Another objective of the present invention is to increase the quality of the image printed using a printer controller card without increasing the amount of frame buffer memory required to store the pixel representation of that image.

A further objective of the present invention is to increase the quality of the image printed using a printer controller card without requiring additional hardware circuitry on the printer controller card or the print engine of the laser printer.

Still another objective of the present invention is to implement the smoothing method of the present invention during the fill process of the rasterization of the pixel representation of the image without requiring any post-rasterization processing or circuitry to accomplish the smoothing of the images.

These and other objectives of the present invention will become apparent with reference to the drawings, the detailed description of the preferred embodiment and the appended claims.

DESCRIPTION OF THE DRAWINGS

FIG. 1 is a block diagram of laser printing system having a printer controller card for generating an image to be printed by a laser printer having unequal resolutions in the horizontal and vertical dimensions.

FIGS. 2a, 2b and 2c are schematic pixel representations of a shallow horizontal outline edge for two prior art pixel representations and the modified pixel representation in accordance with the present invention.

DESCRIPTION OF THE PREFERRED EMBODIMENTS

Figure 3A:
FIGS. 3a and 3b are actual sample printouts of the same filled polygon having a shallow horizontal edge using a prior laser printing system and a laser printing system incorporation the present invention.

Referring now to FIG. 1, a typical desktop publishing system 10 having the printer controller card that executes the software that comprises the preferred embodiment of the present invention will be described. The hardware for the desktop publishing system 10 is comprised of a personal computer 12 connected with a small, inexpensive laser printer 14. The personal computer 12 may be any one of a variety of personal computers such as an IBM PC, XT/AT, 386, or PS/2, available from International Business Machines, Armonk, N.Y., or an Apple Macintosh, available from Apple Computers, Inc. Cupertino, Calif. The personal computer 12 may be provided with a desktop publishing software package, such as Ventura Publisher, available from Xerox Corporation, PageMaker, available from Aldus Corporation, or GEM Desktop Publisher, available from Digital Research, Inc. The laser printer 14 may be any type of Canon CX or SX laser printer such as the HP LaserJet Series II available from Hewlett Packard, the LaserWriter, available from Apple Computer, Inc., or the Canon LBP8-III, available from Canon.

In normal operation without a printer controller card, the personal computer 12 includes a main PC mother board 16 and a serial port 18 through which the personal computer 12 communicates with the internal controller 20 of the laser printer 14. The computer 12 sends a serial bit stream to the laser printer 14 over an RS-232-C serial interface 22 in the form of various commands and data that represent the image to be printed by the laser printer 14. The internal controller 20 decodes the serial bit stream and generates the control signals that will be supplied to the laser 24 to drive the print engine 26 that creates the printed images corresponding to the various commands and data received by the internal controller. For a more detailed explanation of the internal operation of the laser printer 14, reference is made to the LaserJet II Printer User's Manual, Edition 1, available from Hewlett-Packard.

Because of the inherent limitations on the speed at which the commands and data can be transferred over the serial interface and decoded by the internal controller 20, the page throughput for the laser printer 14 is typically very low, 6 pages per minute or less, depending upon the formatting and type of information being printed. To solve this problem and to simultaneously increase the quality and performance features of the laser printer, various printer controller cards 30 have been introduced into desktop publishing systems, such as the LX6 Professional, available from LaserMaster Corporation, Eden Prairie, Minn. The printer controller card 30 of the preferred embodiment is located in the personal computer 12 and communicates directly with the PC mother board 16 via an internal bus 28. It will be recognized, however, that the printer controller board 30 may be located in the laser printer 14 or that the present invention may be implemented within the internal controller 20 of the laser printer 14.

In the preferred embodiment, the printer controller card 30 is an LX6 Professional printer controller card selected to match the particular type of laser printer 14 being used in the desktop publishing system 10. The LX6 controller consists of a frame buffer 32, a co-processor 34 and a video interface 36. The co-processor 34 receives the various commands and data representing the image to be printed from the PC mother board 16 via the bus 28. Because the bus 28 is a parallel bus, the transfer rate is much faster than for the serial port 18. The co-processor 34 decodes the commands and information and produces a mathematically pure ideal outline corresponding to a filled polygon that will represent each image or character to be printed. The co-processor 34 may also aid the personal computer 12 in a rendering lines, graphics and characters as determined by the particular application software package currently being run on the personal computer 12.

Once the ideal outline is generated, it is then filled in or "rasterized" to produce a pixel representation of the image to be printed that is stored in the memory of the frame buffer 32. Any number of known fill techniques or algorithms may be used to fill in the pixels inside of the outline, depending upon how overlapping images are to be handled. When the laser printer 14 is ready to print a page or "frame" worth of images, the pixel representation in the frame buffer 34 is transferred to the laser printer 14 via the video interface 36 in the printer controller 30 that communicates directly with the laser 24 via a video cable 38. An internal switch 40 in the laser printer 14 allows the printer controller 30 to override the internal controller 20 of the laser printer and directly modulate the laser 24. It is this direct modulation of the laser 24 that allows the printer controller 30 to increase the horizontal resolution of the laser printer 14. For a more detailed explanation of the operation the LX6 printer controller 30, reference is made to the LX User Guide, which is incorporated herein by reference and is available from LaserMaster Corporation.

Figure 3B:
Figure 4A:
FIGS. 4a and 4b are the same sample printouts as shown in FIGS. 3a and 3b shown in 4× scale.
Figure 4B:

Referring now to FIGS. 2a-ec, the differences between the smoothing method of the present invention and the prior art will be described. Each of FIGS. 2a-2c show a single raster horizontal raster line 50 comprised of a plurality of pixels 52 that may either be white ("off") or black ("on"). Also shown is the ideal line 54 that forms the outline of the image or character to be printed. In this case, the ideal line 54 is the worst case version of a shallow horizontal line for the edge of an outline. The prior art is represented by the 300×300 dpi raster line 50 generated by the internal controller 20 as shown in FIGS. 2a1, and the 600×300 dpi raster line 50 generated by the LX6 controller 30 without using the method of the present invention. It can easily be seen that there is a very definite and sharp vertical transition point 56 at the edges of the two pixels adjacent the point where the ideal line 54 crosses the midway vertical height of the pixels 52. This define and sharp vertical transition point 56 creates jagged edges or "steps" that are visible to the human eye as shown for example in FIGS. 3a and 4a. In contrast, the raster line 50 shown in FIG. 2c that is generated by the LX6 controller 30 using the method of the present invention does not have such a sharp black-and-white vertical transition point 56. By selectively turning on pixels in the raster line 50 to the left of the transition point 56 and turning off pixels to the right of the transition point 56, the present invention smooths the transition point 56 as seen by the human eye as shown for example in FIG. 3b and 4b. Vertical and near vertical edges are smoothed in much the same fashion. It will be understood that the smoothing of transitions may also be effective when operating at equal resolutions, although the preferred embodiment of the present invention is most successful with unequal horizontal and vertical dimensions.

In the preferred embodiment, the smoothing method of the present invention is applied by the co-processor 34 as it is generating each horizontal raster line 50 to be stored in the frame buffer 32. Typically, the horizontal raster lines 50 are processed from top to bottom in the frame buffer 32 and the pixels 52 are processed from left to right, although it will be recognized that the raster lines 50 and pixels 52 may be processed in any direction so long as the processing is consistent throughout an entire page in the frame buffer 32. As the decision is made whether to turn a pixel 52 on or off, a fill value representing the area between edge of the ideal outline 54 and the edge of the pixel 52 is accumulated. When the fill value is equal to or greater than the total area of a single pixel, the pixel presently being operated on is turned "on" and the area of a single pixel is subtracted from the fill value. In this embodiment, the fill value acts like a running accumulator with the carry out of the accumulator being used to determine whether the pixel presently being processed should be turned "on". Any number of methods can be used to determine the amount of the fill value for each pixel. For example, instead of calculating the entire area inside the ideal outline, the height of the midpoint of the segment of the ideal outline in the pixel or the height of the intersection of the ideal outline with the right or left edge of the pixel could be used to estimate the value of the area inside the ideal outline. Similar algorithms may be used to process short vector and curves in order to apply the smoothing method of the present invention to a variety of different shapes.

Figure 5:
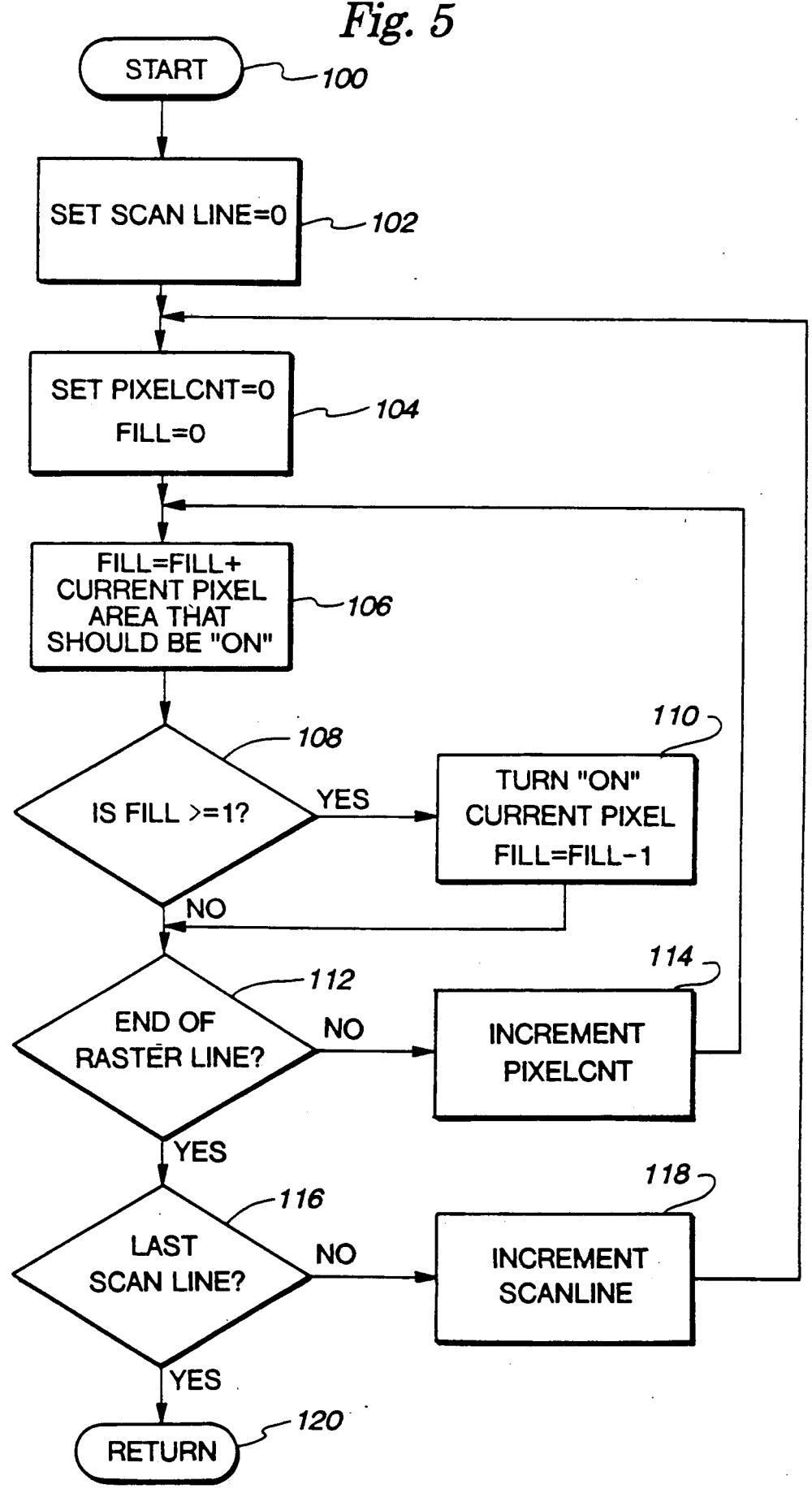
FIG. 5 is a flowchart showing the steps of the preferred embodiment of the smoothing method of the present invention.
Figure 6A:
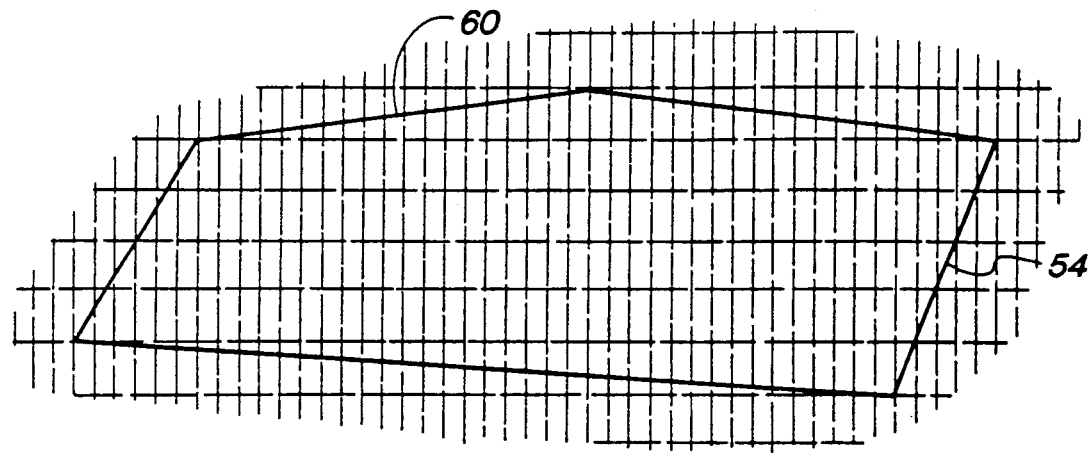
FIGS. 6a, 6b and 6c are pixel representation of the outline of a filled polygon showing the ideal outline alone, the ideal outline as filled using a prior laser printing system and the ideal outline as filed using a laser printing system incorporating the present invention.

Referring now to FIGS. 5 and 6, the operation of the preferred method of the present invention will be described in greater detail. At Start 100, an ideal outline 54 as shown in FIG. 6a has been determined based upon the outline of the image or character to be printed. It should be noted that, in general, the characters or images to be printed can be thought of as filled polygons, or combinations of filled polygons. It is also possible to use the method of the present invention with ideal outlines 54 whose edges are in the form of arcs and curves, rather than straight lines. At 102, the value SCANLINE representing the number of horizontal scan lines 50 in the frame buffer 32 is set equal to zero. At 104, the value PIXELCNT representing the number of pixels 52 in a scan line 50 and the value FILL representing the area of a single pixel 52 are also set to zero. In this embodiment, the area of a single pixel 52 is assumed to be one for simplicity of explanation. It will be understood that the value of FILL may be determined using any of the methods discussed above for estimating the area of the pixel 52 inside the ideal outline 54.

At this point, the software program that is implementing the method of the present invention on the co-processor 34 of the controller card 30 is ready to start rasterizing the ideal outline 54 to produce the horizontal raster lines 50 that will be stored in the frame buffer 32. At 106, the value of the current pixel area that should be "on" because it is inside the ideal outlet 54 is added to FILL. At 108, the value of FILL is compared to see if the current pixel should be turned on. If so, at 110, the current pixel is turned on and the value of the area of a single pixel (1) is subtracted from FILL. At 112, a check on PIXELCNT to see if processing is at the end of a raster line 54. If not, then PIXELCNT is incremented and the loop is reentered at 106. If it is the end of a raster line, then a check on SCANLINE is made at 116 to see if this is the last raster line in the frame buffer 32. If not, the SCANLINE is incremented at 118 and the loop is reentered at 104. When the frame buffer 32 has been completely rasterized, then control is returned from the software program via RETURN 120.

Figure 6B:
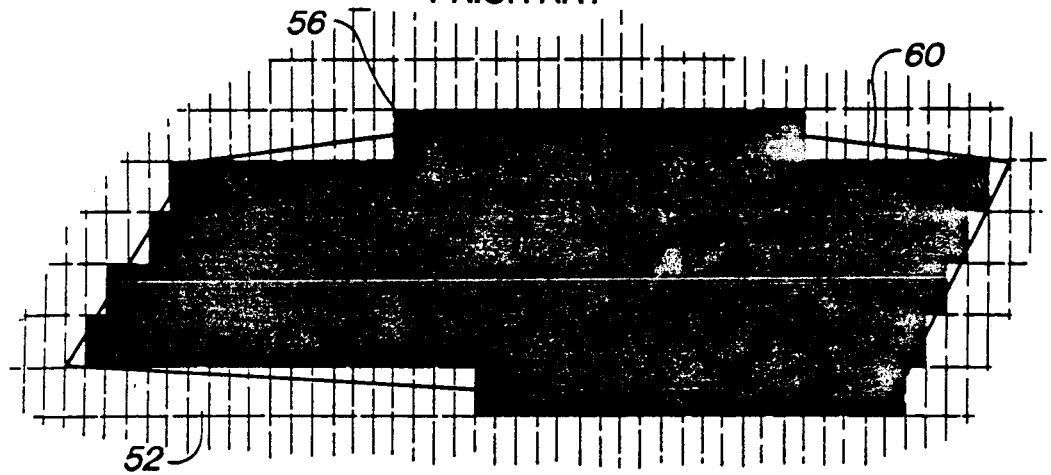
Figure 6C:
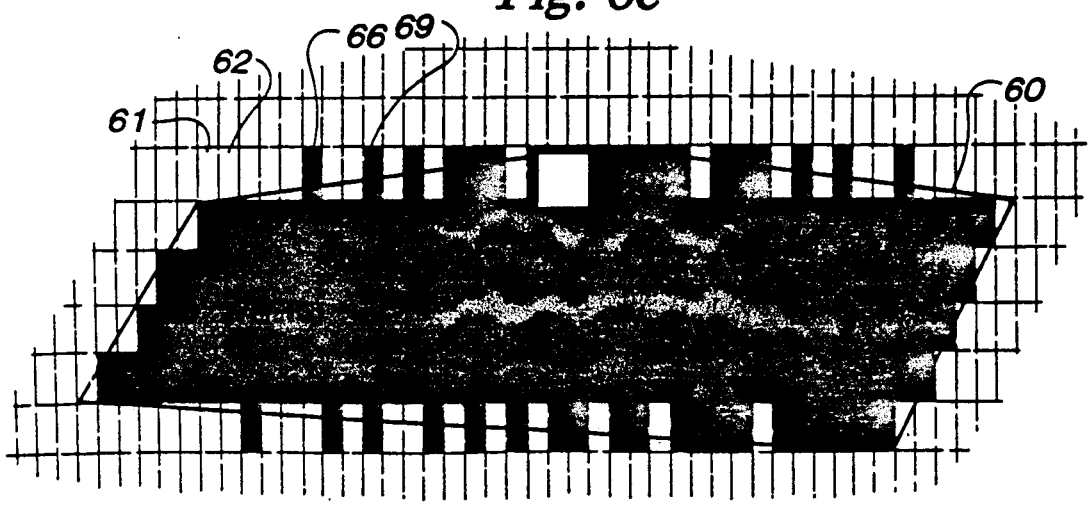

To understand how the preferred embodiment of the present invention would work in practice and how it compares with the prior art, reference is made to FIGS. 6b and 6c. It will be noted that the pixels 52 in these figures are rectangular indicating the non-uniform horizontal and vertical resolutions of the printer used to print these images. Using the line segment 60 as an example, it will be seen that the line segment 60 is one pixel high and 20 pixels long. In this case, the transition point 56 using the prior art rasterization methods is 10 pixels in from ether end of the line segment 60. All of the pixels to the left of transition point 56 are "off" and all of the pixels to the right of transition point 56 are "on". In contrast, in FIG. 6c, the pixels 52 along the line segment 60 are selectively turned off and on around the transition point 56. For purposes of estimating the area of each pixel 52 to be turned on, an assumption is made that the increase in area for each pixel is represented by the slope of the line: 1/20. Hence, for pixel 61, the area inside the ideal outline 54 (below the line segment 60) is 1/20th the area of an entire pixel 52. For pixel 62, the area is 2/20th, etc. By accumulating the values for each of the pixels in line segment 60, it can be seen that at pixel 66, the value of FILL=21/20 (1/20+2/20+3/20+4/20+5/20+6/20). Consequently, pixel 66 is turned on and FILL now equals 1/20. The process is continued and at pixel 69, FILL is again greater than or equal to 1 and FILL=25/20 (1/20+7/20+8/20+9/20).

Although the preferred embodiment of the present invention is described with respect to the filling or rasterizing of an ideal outline, it should be noted that the method of the present invention may be applied equally as well as to any filled polygon where it is desired to smooth the horizontal components of the polygon when printing the image out on a printer having unequal horizontal and vertical resolutions. In this situation, the ideal outline could be assumed to be a series of lines segments constructed around the outermost edges of the horizontal components of the filled polygon.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A method for smoothing the edges of an image to be printed by a binary imaging printer having unequal pixel resolutions in the horizontal and vertical dimensions, comprising the steps of:

providing a processor means with an ideal outline of the image;

rasterizing the ideal outline of the image using the processor means to determine which pixels to turn on and which pixels to turn off in a frame buffer memory means that stores a pixel representation of the image to be printed by the printer;

smoothing the edges of the digital outline by selectively modifying the on and off states of pixels on either side of each vertical transition point along the horizontal components of the edges of the pixel representation of the image to produce a modified pixel representation in the frame buffer means; and communicating the modified pixel representation stored in the frame buffer memory means to the printer such that the printer may print the smoothed image.

2. A method of smoothing the horizontal components of the edges of an ideal outline of an image to be printed by a binary imaging printer having unequal pixel resolutions in the horizontal and vertical dimensions, comprising the steps of:

rasterizing the ideal outline of the image using a processor means to process a plurality of horizontal raster lines comprised of a plurality of pixels, each pixel having a given total area, to form a pixel representation of the image in a frame buffer, the rasterizing being performed to smooth the horizontal components of the ideal outline of the image by performing the following steps for each of the horizontal raster lines;

accumulating a fill value representing the area inside the ideal outline for the pixel currently being processed;

determining if the fill value is greater than the total area; and if the fill value is greater than the total area, turning on the pixel currently being processed and subtracting the total area from the fill value.

3. The method of claim 1 wherein the processor means is comprised of a printer control card operably connected with a computer, the printer control card including a co-processor for rasterizing the ideal outline of the image, the frame buffer memory means for storing the pixel representation of the image to be printed by the printer, and a video interface for communicating the modified pixel representation stored in the frame buffer means to the printer.

4. The method of claim 3 wherein the ideal outline is generated by the co-processor in response to commands and data received from the computer.

5. The method of claim 1 wherein the binary imaging printer is a laser printer including a laser and a marking engine.

6. The method of claim 5 wherein the step of communicating the modified pixel representation to the printer is accomplished by using a video interface to directly modulate the laser in the laser printer.

7. The method of claim 1 wherein the step of smoothing the edges of the digital outlines is accomplished by:

accumulating a fill value representing the area inside the ideal outline for the pixel currently being processed;

determining if the fill value is greater that the total area; and if the fill value is greater than the total area, turning on the pixel currently being processed and subtracting the total area from the fill value.

8. The method of claim 2 wherein the step of accumulating a fill value representing the area inside the ideal outline for the pixel currently being processed is accomplished by calculating the entire area inside the ideal outline.

9. The method of claim 2 wherein the step of accumulating a fill value representing the area inside the ideal outline for the pixel currently being processed is accomplished by estimating the area inside the ideal outline based upon the height of the midpoint of a segment of the ideal outline that crosses the pixel currently being processed.

10. The method of claim 2 wherein the step of accumulating a fill value representing the area inside the ideal outline for the pixel currently being processed is accomplished by estimating the area inside the ideal outline based upon the height of the left height of the left edge of a segment of the ideal outline that crosses the pixel currently being processed.

11. The method of claim 2 wherein the step of accumulating a fill value representing the area inside the ideal outline for the pixel currently being processed is accomplished by estimating the area inside the ideal outline based upon the height of the right edge of a segment of the ideal outline that crosses the pixel currently being processed.

* * * * *